July 31, 1956  V. D. BOWLES  2,756,502

ORTHODONTIC BRACKET

Filed Jan. 24, 1955

INVENTOR.
Victor Drumm Bowles
BY
ATTORNEY.

United States Patent Office 2,756,502
Patented July 31, 1956

2,756,502
ORTHODONTIC BRACKET

Victor Drumm Bowles, Independence, Mo.

Application January 24, 1955, Serial No. 483,754

6 Claims. (Cl. 32—14)

This invention relates generally to orthodontic appliances of the type which include, as components thereof, tooth bands, brackets, arch wires, ligature wires and various other auxiliary attachments.

The most important object of the present invention is the provision of a bracket which is specially formed and adapted for use in orthodontic appliances and, more particularly, the present invention relates to a bracket which is so constructed as to render the same suitable for universal and multi-phase application in any of the several and various techniques employed by specialists in orthodontics.

A further important object of the present invention is to provide an orthodontic bracket which is longitudinally arched to conform generally to the outer surface of a tooth and which is provided with a plurality of elongated slots or channels in the inner and outer faces thereof for receiving the one or more arch wires and ligature wires that are used in conjunction with the brackets and other attachments in the correction of irregularities in tooth alignment.

Other objectives of the present invention include the relative size and disposition of the slots or channels; the provision of flanges on the bracket for receiving the welds with which the bracket is attached to a tooth band; and many additional and advantageous features which will become apparent in the specification which follows and from a study of the appended drawing, wherein.

Figure 1:
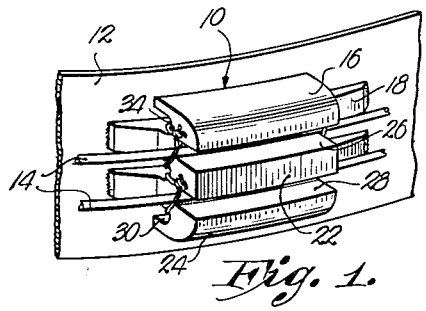
Figure 1 is a perspective view of the orthodontic bracket of the present invention, showing the same attached to a tooth band and in association with two round arch wires.

Referring now to the drawing, wherein like numerals indicate similar parts, the orthodontic bracket of the present invention is designated broadly by the numeral 10 and is illustrated, in the several views, in association with an individual tooth band 12 and various combinations of arch wires 14.

The bracket 10 is generally elongated and rectangular and includes a central body portion 16 as well as a plurality of integral flanges 18 extending outwardly from the body portion 16 at each end thereof respectively. The flanges 18 receive the welds which are conventionally employed in attaching a bracket 10 to a tooth band 12. Body portion 16 has a concave, inner face 20, a longitudinally arcuate, outer face 22 and is beveled along the outer, longitudinal edges as at 24.

Figure 4:
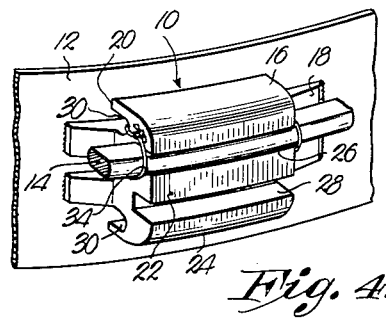
Fig. 4 is a perspective view of the orthodontic bracket of the present invention, showing the same attached to a tooth band and in association with a single, rectangular arch wire.
Figure 5:
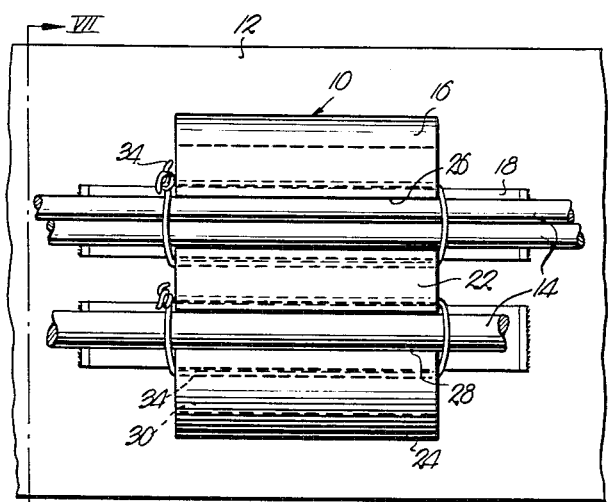
Fig. 5 is an enlarged, fragmentary, plan view of the bracket, tooth band and arch wire assembly of Fig. 2.
Figure 7:
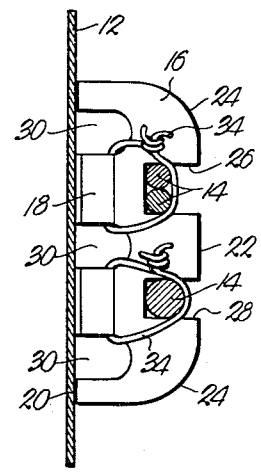
Fig. 7 is an enlarged, cross-sectional view taken on line VII—VII of Fig. 2 and showing the bracket in end elevation.
Figure 6:
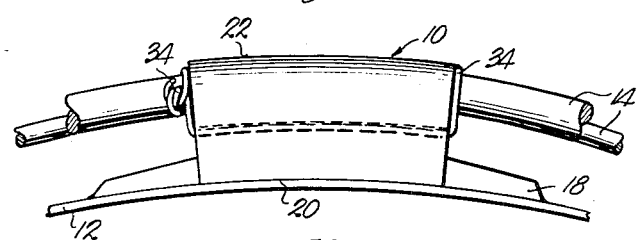
Fig. 6 is an enlarged, fragmentary, side, elevational view of the assembly shown in Fig. 2.

As is best illustrated in Fig. 4, body portion 16 is fabricated with a pair of spaced, longitudinal, arch wire-receiving slots 26 and 28 in the outer face 22. The slot 26 is relatively wider than the slot 28, for a purpose to be discussed more fully hereinafter. In its inner, concave face 20, body portion 16 is provided with three spaced, parallel, longitudinal, ligature wire-receiving channels 30 which are staggered with respect to the slots 26 and 28 and with respect to the flanges 18. The brackets 10 may be made from stainless steel, an alloy of platinum and gold, or any other suitable material.

Figure 2:
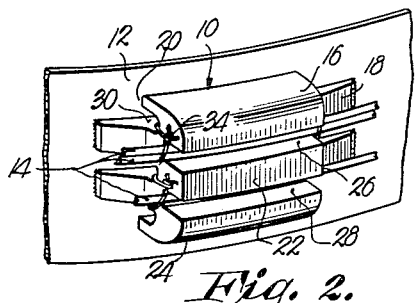
Fig. 2 is a perspective view similar to Fig. 1 and showing three round arch wires in association with the bracket.

As best shown in Fig. 2, the flanges 18 project outwardly from the body portion 16 between each pair of channels 30 and at each end respectively of the body portion 16. Thus, there is a flange 18 at each end of and beneath each of the slots 26 and 28. The flanges 18 have inner, arcuate surfaces 32 which conform generally to the configuration of the concave, inner face 20 and are coplanar therewith.

In this manner, there has been provided a longitudinally arched bracket 10 having similarly arched slots 26 and 28 and channels 30, which bracket 10 serves as a base or anchor for ligature wires 34 of dead-soft alloy or the like. The brackets 10 additionally receive the arch wires 14, or chrome alloy or the like, during the alignment process and, therefore, serve as a guide for the tooth to which the band 12 has been attached as the tooth is gradually moved within the limits of normal bone and muscle development into a proper alignment and relationship with the adjoining teeth.

As is well known in the field of orthodontics, several successful techniques have been developed for using mechanical appliances such as that which is discussed herein in the correction of irregularities in tooth alignment. In following these various techniques, the orthodontist has available a wide selection of arch wires 14, tooth bands 12, conventional brackets and ligature wires 34. For example, it is well known that round, square or rectangular arch wires 14 may be chosen for the various phases of tooth movement. Similarly, many shapes and sizes of brackets 10 are available for use with various arch wires 14 and other attachments which are suitable for a particular phase.

The orthodontic bracket 10 of the present invention has been so designed and constructed as to be readily adapted for universal application in any single technique or combination of techniques and for any particular type or phase of tooth movement which is necessary.

In short, the bracket 10 is adapted for three-dimensional control over tooth movement in that it is suitable for use with whatever combination of arch wires 14 and other attachments that may be necessary for tooth intrusion or extrusion, buccal or lingual movement and in imparting torquing action in a buccal, lingual, mesial or distal direction. All these movements are necessary in the alignment and/or positioning of teeth.

In use, therefore, the bracket 10 may be employed with innumerable combinations of arch wires 14 according to the particular alignment phase at hand. Viewing Fig. 1, there is illustrated a bracket assembly including one round arch wire 14 in each of the slots 26 and 28, each of the wires 14 being secured in place by a ligature wire 34. The illustration of Fig. 2 is, in all respects, similar to that of Fig. 1 except that another round arch wire 14 has been placed in the wider slot 26 of bracket 10. Since the round wires 14 which are readily available are of spring wire having limited resiliency characteristics, the assemblies of Figs. 1 and 2 are best suited for application in the initial phases of tooth movement.

Figure 3:
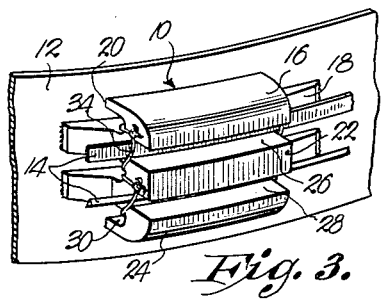
Fig. 3 is a perspective view such as that of Figs. 1 and 2 except that one flat arch wire and one round arch wire are in place on the bracket.

In the intermediate phases of tooth alignment and movement, the same brackets 10 and bands 12 may be used, as shown in Fig. 3, with a flat arch wire 14 in the slots 26 and a round arch wire in the slot 28. Similarly, in the final alignment phases, the flat and round arch wires 14 may be discarded and the brackets 10 used with a single, rigid, rectangular arch wire 14, as shown in Fig. 4. The rectangular arch wires 14 are sufficiently rigid to prevent bending of the wire 14 toward the bracket 10 and the tooth to which it is banded when the rectangular wire 14 is placed edgewise in one of the slots 26 or 28. Rather, the bracket 10 moves into the desired alignment with the rectangular wire to which it is ligated.

It is apparent therefore, that, when the brackets 10 of the present invention are used in an orthodontic appliance, there is no need for changing brackets 10 and bands 12 as the treatment progresses and as different combinations of arch wires 14 are placed in use. Rather, as previously stated, the brackets 10 are well adapted for universal and multi-phase application in the various stages of the various techniques.

Since the slots 26 and 28 each lie between a pair of ligature wire-receiving channels 30, the latter are well situated in a manner not heretofore contemplated, for ready installation and application of ligature wires 34. When more than one arch wire 14 is employed in a particular appliance, there are two slots 26 and 28, each of which may be used in conjunction with the plurality of channels 30 in any desired fashion. Similarly, it is contemplated that a single arch wire 14 may be moved from one slot to the other as the positioning of the particular tooth progresses.

It is noted that the inner face 20 of the bracket 10 is substantially planar and, therefore, that the channels 30 are closed throughout the length thereof when bracket 10 is attached to a tooth band 12 so that there is no possibility of the ligature wires 34 slipping out of the channels 30 after the wires 34 have been attached in the manner illustrated, to a spur (not shown) or to any other suitable attachment.

It is obvious that the embodiment herein disclosed may be altered or modified in many details without departing from the broad principles of the present invention. Such modifications are contemplated hereby and it is, therefore, desired to be limited only by the scope of the appended claims.

Having thus described the invention, what is claimed as new and desired to be secured by Letters Patent is:

1. In an orthodontic appliance having tooth bands, ligature wires and at least one arch wire, a bracket for each tooth band respectively, said brackets each having an inner, planar face adapted for attachment to a tooth band and provided with a plurality of spaced, parallel, ligature wire-receiving channels, an outer face provided with at least one arch wire-receiving slot, and a plurality of outwardly projecting flanges, there being a flange between each pair of channels at each end thereof.

2. In an orthodontic bracket as set forth in claim 1 wherein said inner face is concave and wherein said flanges each have an inner, concave surface coplanar with said inner face.

3. In an orthodontic appliance having tooth bands, ligature wires and at least one arch wire, an elongated bracket for each tooth band respectively, said brackets each having an inner, concave face adapted for attachment to a tooth band and provided with a plurality of spaced, longitudinal, ligature wire-receiving channels, an outer face provided with at least one longitudinal, arch wire-receiving slot, and a plurality of outwardly projecting flanges on the bracket at each end thereof respectively, there being a flange between each pair of channels beneath each slot, said channels and said slots being formed in the bracket in opposed, staggered parallelism.

4. In an orthodontic bracket as set forth in claim 3 wherein is provided at least two slots in said upper face and at least three channels in said lower face and wherein said slots vary in width and thereby in transverse cross-section whereby to accommodate arch wires of various sizes and shapes.

5. In an orthodontic bracket as set forth in claim 4 wherein said flanges each have an inner, concave surface coplanar with said inner face.

6. In an orthodontic bracket as set forth in claim 5 wherein said outer face is beveled along the longitudinal edges thereof, said bracket and the slots and channels therein being longitudinally arched in substantial conformity with the curvature of said inner, concave face of the bracket.

References Cited in the file of this patent

UNITED STATES PATENTS 1,553,797    Angle _____ Sept. 15, 1925